United States Patent
Yi et al.

(10) Patent No.: US 11,297,638 B2
(45) Date of Patent: Apr. 5, 2022

(54) METHOD FOR TRIGGERING A BUFFER STATUS REPORTING IN WIRELESS COMMUNICATION SYSTEM AND A DEVICE THEREFOR

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/613,227

(22) PCT Filed: May 18, 2018

(86) PCT No.: PCT/KR2018/005735
§ 371 (c)(1),
(2) Date: Nov. 13, 2019

(87) PCT Pub. No.: WO2018/230851
PCT Pub. Date: Dec. 20, 2018

(65) Prior Publication Data
US 2020/0178282 A1 Jun. 4, 2020

Related U.S. Application Data

(60) Provisional application No. 62/518,605, filed on Jun. 13, 2017.

(51) Int. Cl.
*H04W 72/12* (2009.01)

(52) U.S. Cl.
CPC ... *H04W 72/1284* (2013.01); *H04W 72/1247* (2013.01)

(58) Field of Classification Search
CPC ............ H04W 72/1247; H04W 72/1284
See application file for complete search history.

(56) References Cited

U.S. PATENT DOCUMENTS

| 7,769,926 | B2 | 8/2010 | Wu et al. | |
|---|---|---|---|---|
| 9,674,867 | B2 | 6/2017 | Lee et al. | |
| 2011/0255492 | A1 | 10/2011 | Dai et al. | |
| 2016/0227433 | A1 | 8/2016 | Lee et al. | |
| 2017/0118671 | A1 | 4/2017 | Lee et al. | |
| 2018/0359773 | A1* | 12/2018 | Tesanovic | H04W 72/1268 |
| 2021/0051738 | A1* | 2/2021 | Babaei | H04W 74/0891 |

FOREIGN PATENT DOCUMENTS

EP 2661138 A1 11/2013

* cited by examiner

*Primary Examiner* — Rhonda L Murphy
(74) *Attorney, Agent, or Firm* — Dentons US LLP

(57) ABSTRACT

The present invention relates to a wireless communication system. More specifically, the present invention relates to a method and a device for triggering a buffer status reporting in wireless communication system, the method comprising: configuring with a first SR resource configuration and a second SR resource configuration; checking whether or not data is a first data on logical channels mapped to the first SR resource configuration, when the data becomes available for a first logical channel mapped to the first SR resource configuration, in a state that the first logical channel has a lower priority than a highest priority among priorities of logical channels having data, which are mapped to the second SR resource configuration; and triggering a first BSR if the data is the first data on logical channels mapped to the first SR resource configuration.

8 Claims, 12 Drawing Sheets

(a) Control-Plane Protocol Stack (b) User-Plane Protocol Stack (a) Control-Plane Protocol Stack (b) User-Plane Protocol Stack (a) Short BSR and Truncated BSR MAC control element (b) Long BSR MAC control element

METHOD FOR TRIGGERING A BUFFER STATUS REPORTING IN WIRELESS COMMUNICATION SYSTEM AND A DEVICE THEREFOR

This application is a National Stage Entry of International Application No. PCT/KR2018/005735 filed May 18, 2018, which claims the benefit of U.S. Provisional Application No. 62/518,605 filed Jun. 13, 2017, all of which are hereby incorporated by reference in their entirety for all purposes as if fully set forth herein.

TECHNICAL FIELD

The present invention relates to a wireless communication system and, more particularly, to a method for triggering a buffer status reporting in wireless communication system and a device therefor.

BACKGROUND ART

As an example of a mobile communication system to which the present invention is applicable, a 3rd Generation Partnership Project Long TermEvolution (hereinafter, referred to as LTE) communication system is described in brief.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for triggering and transmitting a buffer status reporting in wireless communication system.

In the prior art, the UE triggers a regular BSR when UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG. If there is no UL resource for transmitting the regular BSR, the UE triggers a SR.

The problem in the prior art is that the UE does not trigger a BSR when a data becomes available for a LCH that has a lower logical channel priority than a LCH that already data available for transmission, even if those two LCHs are mapped to different SR resource.

However, if considering that different SR resource is used for requesting radio resource for different type of traffics, the UE needs to trigger a new BSR on a SR resource configuration when a first data becomes available for transmission on the SR resource, if a logical channel where the data receives has lower priority than priorities of other logical channels.

On the other hand, if there is a pending SR in the SR resource configuration, the UE no longer needs to trigger the SR in the same SR resource configuration, but according to the prior art, the UE may trigger the SR in a certain situation. So, the BSR trigger mechanism considering only logical channel priority should be modified in an NR situation where a separate numerology is mapped for each logical channel.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The invention is that when a data becomes available for a logical channel and if it is the first data of a group of logical channels that are mapped to a same SR resource, the UE triggers a regular BSR. If there is no UL resource for transmitting the regular BSR, the UE triggers a SR that is mapped to the logical channel where the data becomes available.

According to the present invention, when the UE has already high priority data (e.g., URLLC), the UE can trigger a BSR for low priority data (e.g., eMBB) for obtaining another SR resource. And when there is any pending SR on a SR resource configuration, the UE may not need to trigger BSR on the same SR resource configuration, if the BSR further triggers SRs to avoid unnecessary waste of resources.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
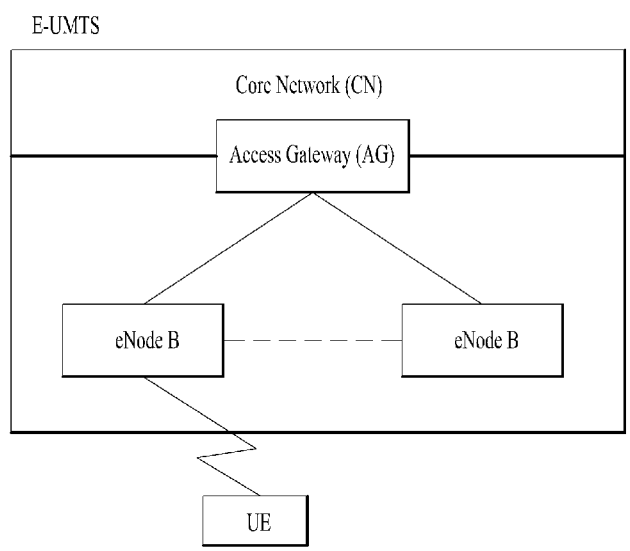
FIG. 1 is a diagram showing a network structure of an Evolved Universal Mobile Telecommunications System (E-UMTS) as an example of a wireless communication system.
Figure 2A:
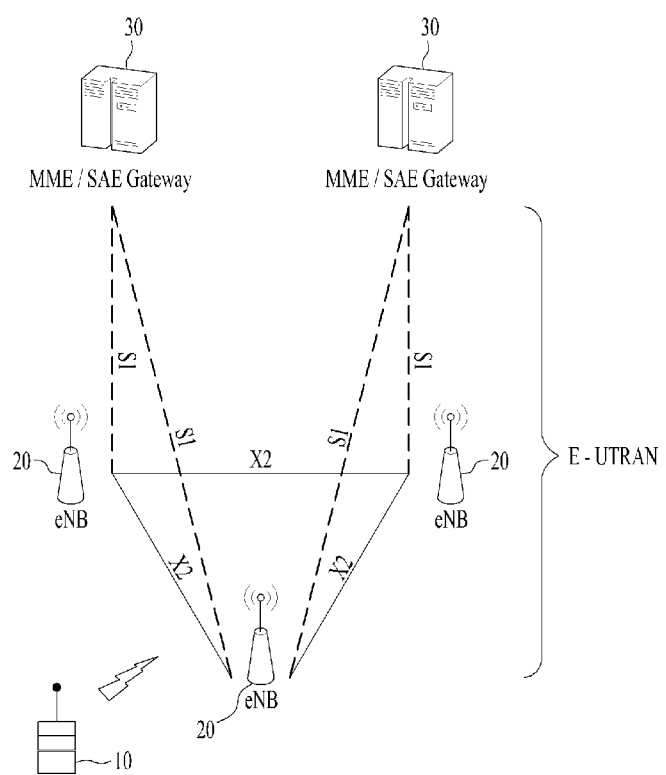
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
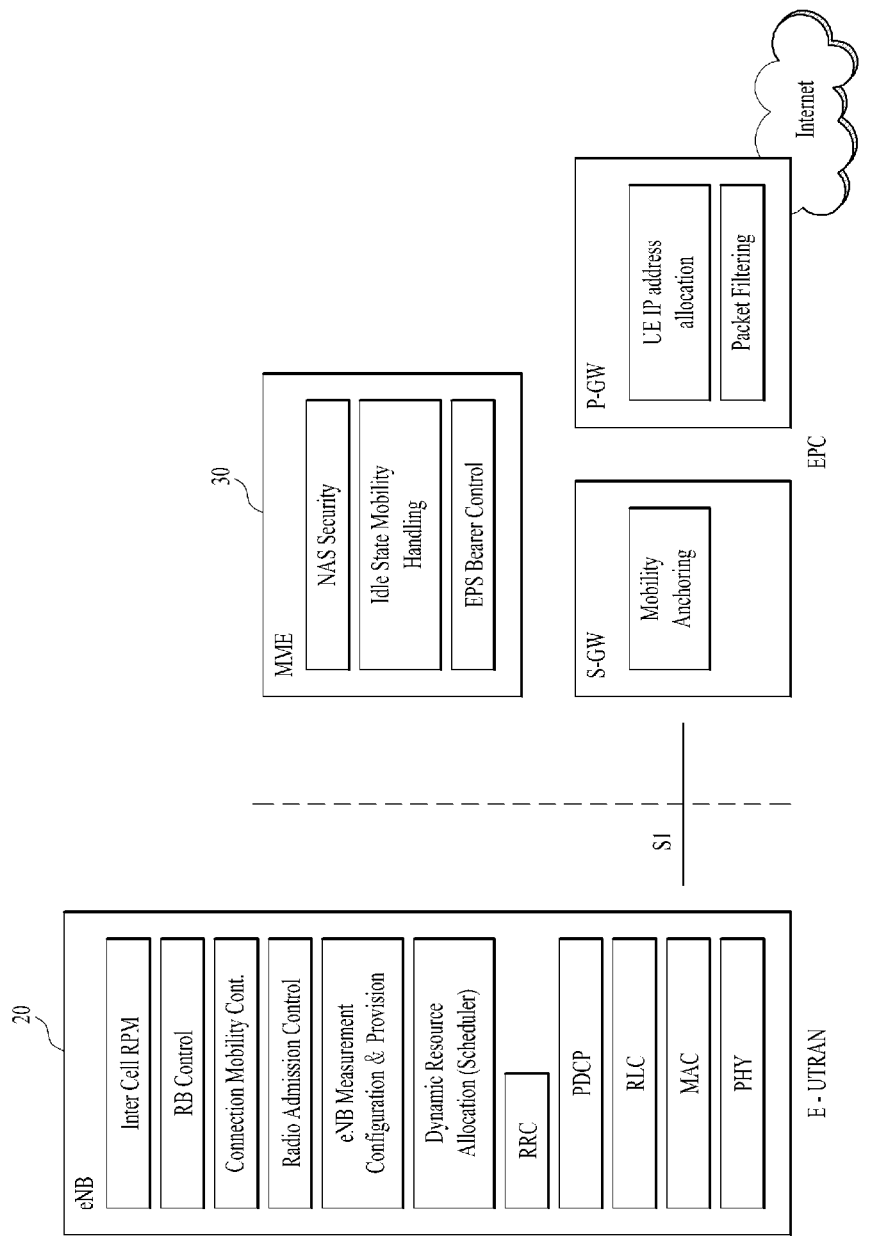
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2b, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
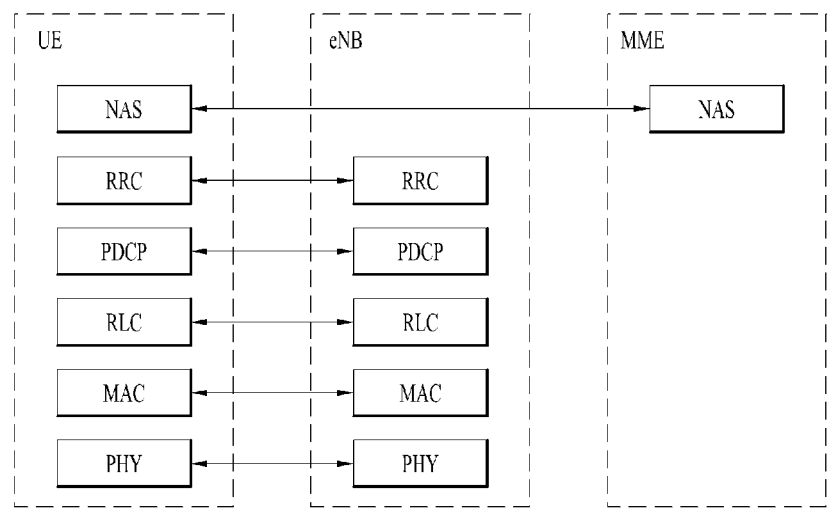
FIG. 3 is a diagram showing a control plane and a user plane of a radio interface protocol between a UE and an E-UTRAN based on a 3rd generation partnership project (3GPP) radio access network standard.
Figure 3:
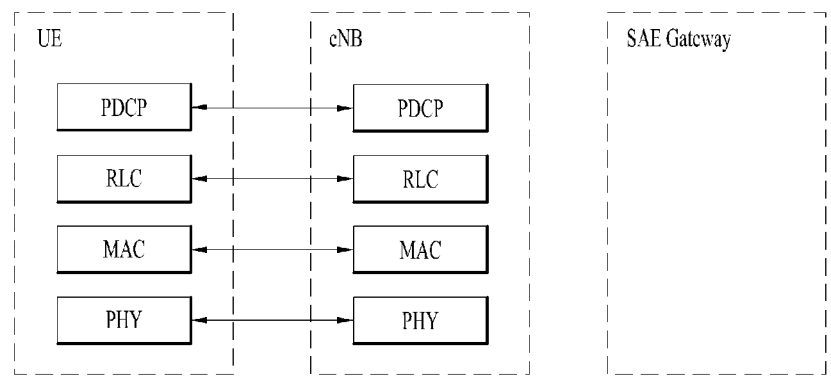

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
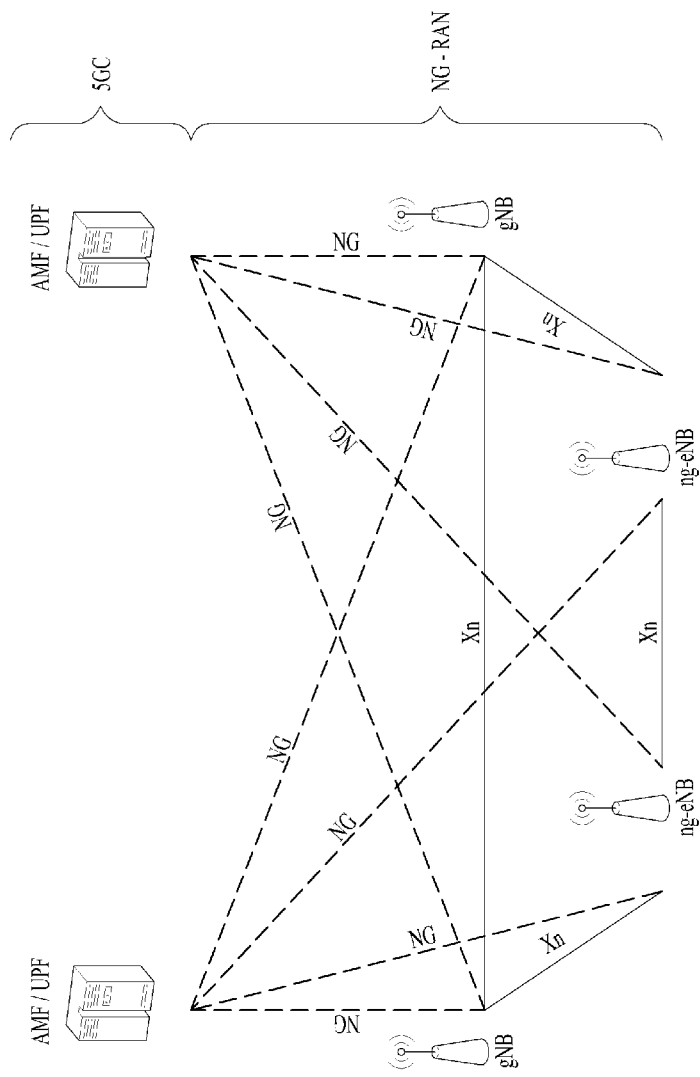
FIG. 4a is a block diagram illustrating network structure of NG Radio Access Network (NG-RAN) architecture.
Figure 4B:
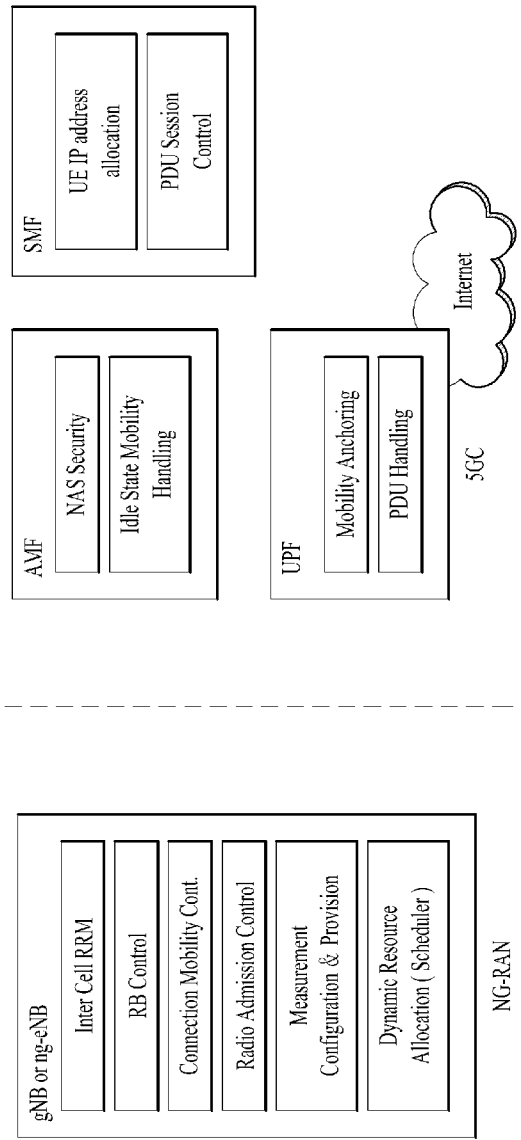
FIG. 4b is a block diagram depicting architecture of functional Split between NG-RAN and 5G Core Network (5GC)

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
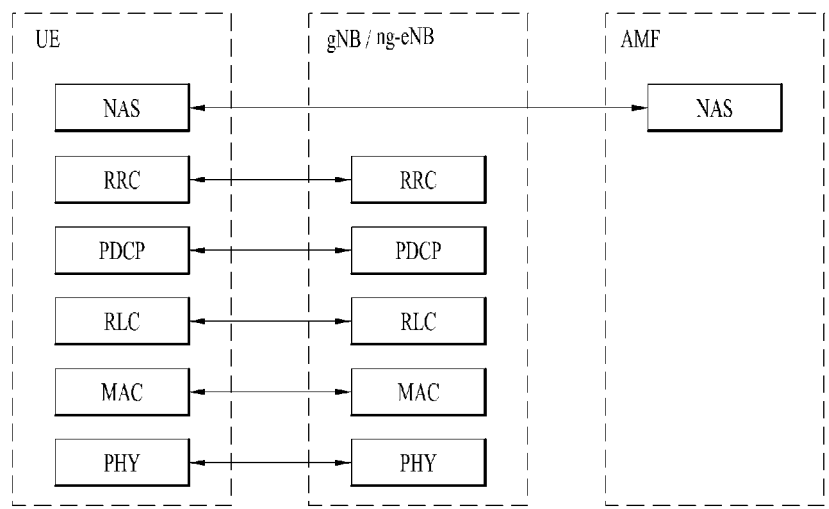
FIG. 5 is a diagram showing a control plane and a user plane of a radio interface protocol between a UE and a NG-RAN based on a 3rd generation partnership project (3GPP) radio access network standard.
Figure 5:
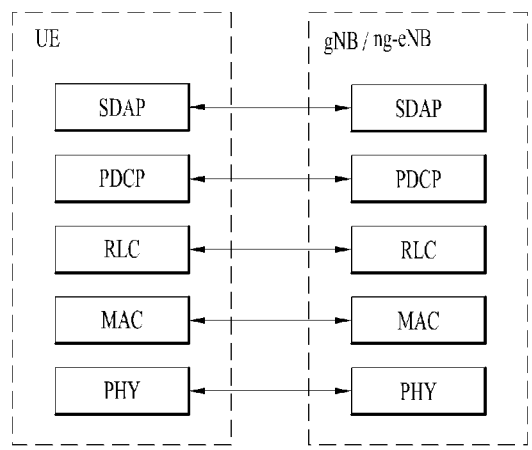

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
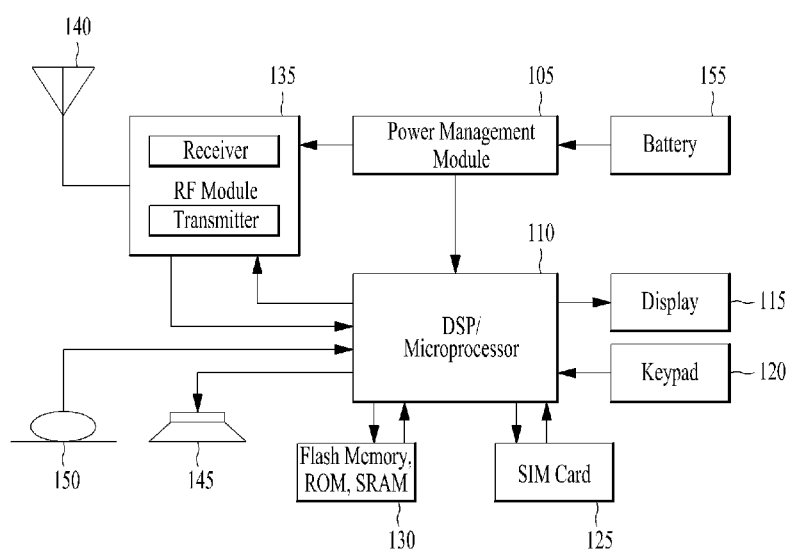
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7:
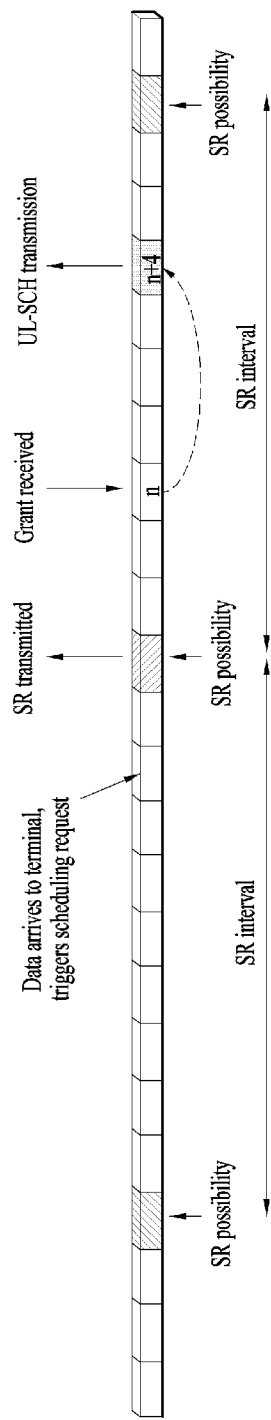
FIG. 7 is a diagram for Scheduling-request transmission.

FIG. 7 is a diagram for scheduling request transmission.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

A scheduling request is a simple flag, raised by the terminal to request uplink resources from the uplink scheduler. Since the terminal requesting resources by definition has no PUSCH resource, the scheduling request is transmitted on the PUCCH. Each terminal can be assigned a dedicated PUCCH scheduling request resource, occurring every nth subframe. With a dedicated scheduling-request mechanism, there is no need to provide the identity of the terminal requesting to be scheduled as the identity of the terminal is implicitly known from the resources upon which the request is transmitted.

When data with higher priority than already existing in the transmit buffers arrives at the terminal and the terminal has no grant and hence cannot transmit the data, the terminal transmits a scheduling request at the next possible instant, as illustrated in FIG. 7. Upon reception of the request, the scheduler can assign a grant to the terminal. If the terminal does not receive a scheduling grant until the next possible scheduling-request instant, then the scheduling request is repeated. There is only a single scheduling-request bit, irrespective of the number of uplink component carriers the terminal is capable of. In the case of carrier aggregation, the scheduling request is transmitted on the primary component carrier, in line with the general principle of PUCCH transmission on the primary component carrier only.

The use of a single bit for the scheduling request is motivated by the desire to keep the uplink overhead small, as a multi-bit scheduling request would come at a higher cost. A consequence of the single-bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below. Knowledge of the service type may also be used—for example, in the case of voice the uplink resource to grant is preferably the size of a typical voice-over-IP package. The scheduler may also exploit, for example, path-loss measurements used for mobility and handover decisions to estimate the amount of resources the terminal may efficiently utilize.

An alternative to a dedicated scheduling-request mechanism would be a contention-based design. In such a design, multiple terminals share a common resource and provide their identity as part of the request. This is similar to the design of the random access.

The number of bits transmitted from a terminal as part of a request would in this case be larger, with the correspondingly larger need for resources. In contrast, the resources are shared by multiple users. Basically, contention-based designs are suitable for a situation where there are a large number of terminals in the cell and the traffic intensity, and hence the scheduling intensity, is low. In situations with higher intensities, the collision rate between different terminals simultaneously requesting resources would be too high and lead to an inefficient design.

Although the scheduling-request design for LTE relies on dedicated resources, a terminal that has not been allocated such resources obviously cannot transmit a scheduling request. Instead, terminals without scheduling-request resources configured rely on the random-access mechanism. In principle, an LTE terminal can therefore be configured to rely on a contention-based mechanism if this is advantageous in a specific deployment.

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR, or when the UL grant(s) can accommodate all pending data available for transmission.

If the Buffer Status reporting procedure determines that at least one BSR has been triggered and not cancelled and if the MAC entity doesn't have enough UL resources allocated for new transmission for this TTI (i.e., if an uplink grant is not configured or the Regular BSR was not triggered due to data becoming available for transmission for a logical channel for which logical channel SR masking (logicalChannelSR-Mask) is setup by upper layers), a Scheduling Request shall be triggered.

Figure 8:
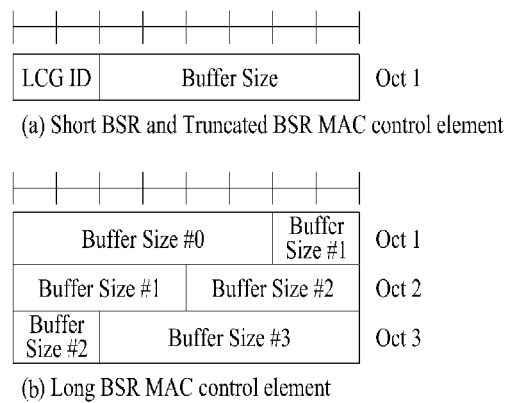
FIG. 8 is a diagram for signaling of buffer status reporting via a MAC CE.

FIG. 8 is a diagram for signaling of buffer status reporting via a MAC CE.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report.

Regarding FIG. 8, Short BSR and Truncated BSR format (a) includes one LCG ID field and one corresponding Buffer Size field. Long BSR format (b) includes four Buffer Size fields, corresponding to LCG IDs #0 through #3. The BSR formats are identified by MAC PDU subheaders with LCIDs as specified in Table 1.

TABLE 1

| Index | LCID values |
| --- | --- |
| 00000 | CCCH |
| 00001-01010 | Identity of the logical channel |
| 01011 | CCCH |
| 01100-10101 | Reserved |
| 10110 | Truncated Sidelink BSR |

TABLE 1-continued

| Index | LCID values |
|---|---|
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Logical Channel Group ID (LCG ID) field identifies the group of logical channel(s) which buffer status is being reported.

The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group.

The Buffer Status Reporting (BSR) procedure is used to provide a serving eNB with information about the amount of data available for transmission in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur: i) arrival of data with higher priority than currently in the transmission buffer—that is, data in a logical-channel group with higher priority than the one currently being transmitted—as this may impact the scheduling decision, (i.e., UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR"; retxBSR-Timer expires and the UE has data available for transmission for any of the logical channels which belong to a LCG, in which case the BSR is referred below to as "Regular BSR") ii) change of serving cell, in which case a buffer-status report is useful to provide the new serving cell with information about the situation in the terminal, iii) Periodically as controlled by a timer (i.e.,periodicBSR-Timer expires, in which case the BSR is referred below to as "Periodic BSR"), iv) instead of padding. If the amount of padding required to match the scheduled transport block size is larger than a buffer-status report, a buffer-status report is inserted. Clearly it is better to exploit the available payload for useful scheduling information instead of padding if possible (i.e., UL resources are allocated and number of padding bits is equal to or larger than the size of the Buffer Status Report MAC control element plus its subheader, in which case the BSR is referred below to as "Padding BSR").

For Regular BSR, if the BSR is triggered due to data becoming available for transmission for a logical channel for which logicalChannelSR-ProhibitTimer is configured by upper layers, if not running, the MAC entity starts the logicalChannelSR-ProhibitTimer. Else, if running, the MAC entity stops the logicalChannelSR-ProhibitTimer.

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

Else if a Regular BSR has been triggered and logical-ChannelSR-ProhibitTimer is not running, if an uplink grant is not configured or the Regular BSR was not triggered due to data becoming available for transmission for a logical channel for which logical channel SR masking (logical-ChannelSR-Mask) is setup by upper layers, a Scheduling Request shall be triggered.

A MAC PDU may contain at most one BSR MAC control element, even when multiple events trigger a BSR by the time a BSR can be transmitted in which case the Regular BSR and the Periodic BSR shall have precedence over the padding BSR.

The MAC entity may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Figure 9:
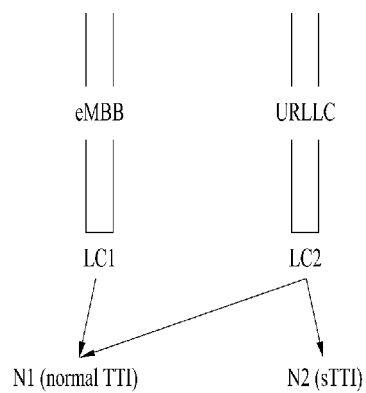
FIG. 9 is an example of mapping between Logical Channel and Numerology.

FIG. 9 is an example of mapping between logical channel and numerology.

In RAN2 #97bis, RAN2 discussed how to distinguish numerologies in SR. The intention to distinguish numerologies in SR is for the UE to receive an uplink grant with proper numerology that can be used for the data transmission.

In NR, there will be a mapping between a logical channel and numerology, where different logical channels can be mapped to the same numerology and one logical channel can be mapped to multiple numerologies.

Normally, the scheduling procedure includes SR, BSR, and data transmission. If BSR can tell the buffer size per numerology, the UE will anyway receive an uplink grant with proper numerology. However, it will take some time to send BSR and then get an uplink grant, which seems not desirable for URLLC data transmission. Therefore, it would be good to indicate the URLLC data via SR so that the gNB provides an uplink grant with proper numerology for sending URLLC data.

This can be realized by configuring SR resource per logical channel or group of logical channels. In specific, when SR is triggered by the data from a logical channel, the UE sends SR by using the SR resource for the logical channel. There is no need to configure separate SR resource for all logical channel but it would be sufficient to configure separate SR resource only for the concerned logical channel.

One may think SR resource can be configured per numerology in order to indicate the numerology of logical channel that triggers SR. However, as one logical channel can be mapped to multiple numerology, the UE may need to select only one SR resource, i.e., one numerology. Also, considering that any numerology mapped to the logical channel can be used for sending the data from the logical channel, SR resource per numerology may not provide sufficient scheduling options to the gNB.

In LTE CA, it is already possible to configure multiple SRs on PCell and PUCCH SCell, but they are treated equally and the UE uses the earliest SR occasion when SR is triggered. LTE DC has the logical channel to cell group mapping restrictions for different bearer types, and hence the restrictions of SR triggered by the corresponding logical channel are only sent to the corresponding cell group. With the agreement of the restriction of logical channel to numerologies/TTI lengths for NR, it should be straightforward to apply similar restrictions for SRs. That is, multiple SR configurations can be configured to the UE and which SR configuration is used depends on the LCH that triggers the SR.

If only maximum TTI length is configured as the restriction for logical channel to numerology/TTI length mapping, for example, when SR is triggered upon data arrival of a logical channel that can be mapped to only UL grant of equal to or smaller than 0.5 ms TTI length, the UE should not send SR on 1ms PUCCH so that the gNB will only schedule UL grant of at most 0.5 ms TTI length. If the configuration is not based on maximum TTI length but with separate configuration of which TTI length is usable for each logical channel, the restriction should still be applicable that SR should not be on the TTI length that is not configured to the logical channel which triggered the SR.

On the other hand, with only restriction of SR on allowed TTI length, if other logical channels that can use UL grant of smaller than 1ms may also send SR on the cells with 0.5 ms TTI length, the gNB would not be able to identify which logical channel(s) triggered the SR, but it can still follow the restriction of only scheduling UL grant with equal to or smaller than the TTI length where SR was sent. If further restrictions are seen needed for the gNB to better distinguish UL grant of which TTI length is requested by the logical channel (s) triggered the SR, the restriction for SR could be only on the maximum allowed TTI length that the LCH can be mapped to.

For example, it is assumed that LCH1 configured to use TTI length of 1ms, 0.5 ms and 0.2 ms, and LCH2 configured to use TTI length of 0.5 ms and 0.2 ms. And SR is configured on PUCCH of 1 ms and 0.5 ms.

If SR on any allowed TTI length can be used, SR on PUCCH of 0.5 ms would not be able to distinguish the trigger is from data arrival of LCH1 or LCH2, the gNB can schedule 0.5 ms UL grant to be sure. While if only SR on PUCCH of maximum TTI length is used, the gNB could know that the UE is requiring UL grant with TTI length equal to or smaller than 0.5 ms based on the reception of SR on 0.5 ms.

Furthermore, from where the SR is received, the gNB would be able to identify which logical channel or logical channels with configured restrictions has triggered the SR, or in other words knows UL grant of which TTI length is requested and can schedule UL grant accordingly. Thus, there is no need to introduce more bits for SR.

The numerology/TTI type of the logical channel that triggered the SR is indicated through numerology/TTI specific SR resource. Therefore, there is a one to one mapping between a certain numerology/TTI type and the configured SR resource. Reasonably, the corresponding configurations including SR periodicity and SR prohibit timer should be per numerology/TTI type, detailed analysis is as below:

The QoSs of different logical channels (services) are different. For example, URLLC has tighter latency requirement than eMBB. When a URLLC service triggers a SR, the required UL grant should be mapped to a numerology/TTI type with short latency. On the other side, for eMBB service, a UL grant with a numerology/TTI type of long latency is enough. The same principle applies to the periodical transmission as well as prohibition of SR. Recent RAN1 agreement to support short-periodicity SR can be used to help meet the UL scheduling latency requirements. A SR requiring a UL grant with a numerology/TTI type of short latency needs to have shorter SR periodicity and SR prohibit timer than that requiring a UL grant with a numerology/TTI type of long latency. Therefore, both SR periodicity and SR prohibit timer should be configured for each numerology/TTI type by network.

Meanwhile, RAN2 agreed that multiple SR resource configurations can be configured to the UE and which SR resource configuration is used depends on the logical channel that triggers the SR. In other words, SR resource is configured per logical channel or a group of logical channels. In specific, when SR is triggered by the data from a logical channel, the UE sends SR by using the SR resource for the logical channel.

In the prior art, the UE triggers a regular BSR when UL data, for a logical channel which belongs to a logical channel group (LCG), becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG. If there is no UL resource for transmitting the regular BSR, the UE triggers a SR.

The problem in the prior art is that the UE does not trigger a BSR when a data becomes available for a logical channel that has a lower logical channel priority than a logical channel that already data available for transmission, even if those two logical channels are mapped to different SR resource.

Considering that different SR resource is used for requesting radio resource for different type of traffics, the BSR trigger mechanism considering only logical channel priority should be modified.

If considering that different SR resource is used for requesting radio resource for different type of traffics, the UE needs to trigger a new BSR on a SR resource configuration when a first data becomes available for transmission on the SR resource, if a logical channel where the data receives has lower priority than priorities of other logical channels. And if there is any pending SR on a SR resource configuration, the UE doesn't need to trigger BSR on the same SR resource configuration anymore to avoid unnecessary waste of resources if the BSR triggers additional SRs.

Figure 10:
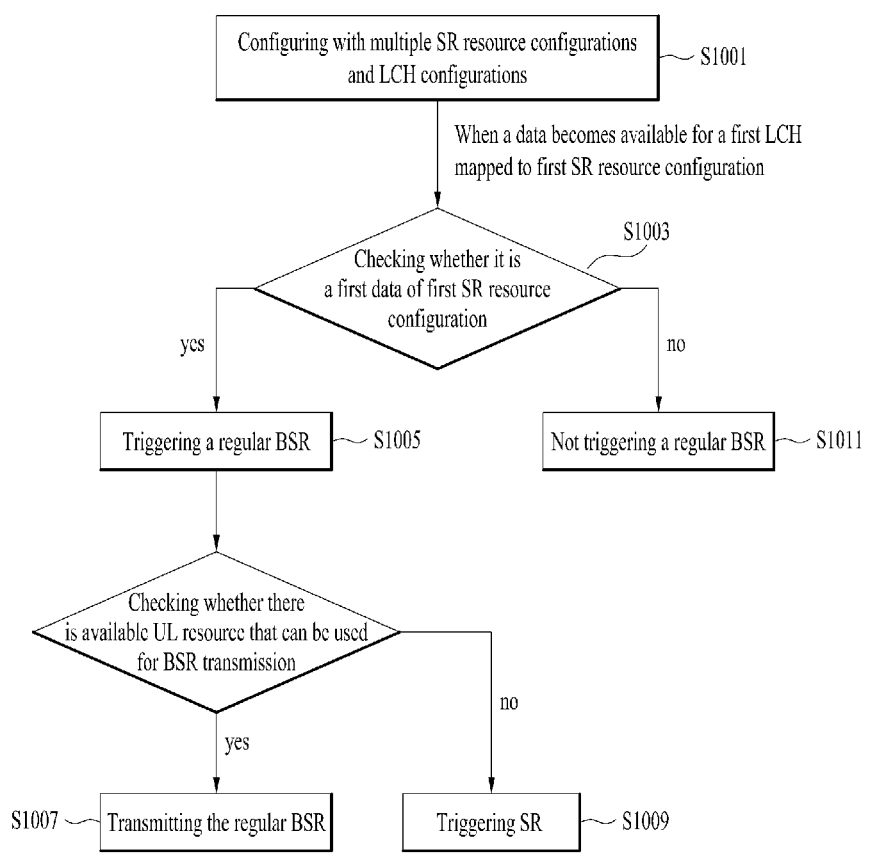
FIG. 10 is a conceptual diagram for triggering and transmitting a buffer status reporting in wireless communication system according to embodiments of the present invention.

FIG. 10 is a conceptual diagram for triggering and transmitting a buffer status reporting in wireless communication system according to embodiments of the present invention.

The invention is that when a data becomes available for a logical channel (LCH) and if it is the first data of a group of LCHs that are mapped to a same SR resource, the UE triggers a regular BSR. Furthermore, if there is no UL resource for transmitting the regular BSR, the UE triggers a SR that is mapped to the LCH where the data becomes available.

For this, it is assumed that the UE is configured with multiple SR resource configurations and LCH configurations (or RB configurations) (S1001).

It is possible that one or more LCHs are mapped to a SR resource.

Preferably, a group of LCHs that are mapped to a SR resource as a SR group. An SR group is mapped to one or more LCHs. An SR group is mapped to one or more logical channel groups (LCGs).

The configuration between multiple SR resource configurations and LCH configurations (or RB configurations) is received via RRC signaling. The UE may receive information of mapping relationship between LCH and SR resource via RRC signaling.

When a data becomes available for a first LCH mapped to the first SR resource configuration, the UE checks whether or not it is a first data of first SR resource configuration (e.g, a first SR group) to which the first LCH is mapped (S1003).

If it is the first data of the first SR group, the UE triggers a regular BSR (S1005).

Preferably, in a state that the first logical channel has a lower priority than a highest priority among priorities of logical channels, which are mapped to second SR resource configuration and have data, the UE can trigger a regular BSR on the first SR resource configuration. In this case, the first SR resource configuration and the second SR resource configuration are different.

If the regular BSR is triggered by the first LCH, the UE checks whether there is available UL resource that can be used for BSR transmission. If there is available UL resource for transmitting the triggered BSR, the UE transmits the regular BSR on the UL resource (S1007). However, if there is no available UL resource for transmitting the triggered BSR, the UE triggers a SR that is mapped to the first LCH and transmit it (S1009).

Otherwise, i.e. there is already data available in a second LCH that belongs to the SR group, the UE further checks whether the first LCH and second LCH belong to a same LCG. If the first LCH and second LCG belong to the same LCG, the UE does not trigger a regular BSR. Or the first LCH and second LCH belong to different LCGs of the SR group, the UE further checks whether the first LCH has higher logical channel priority than the second LCH. If the first LCH has higher logical priority than the second LCH, the UE triggers a regular BSR. Otherwise, the UE does not trigger a regular BSR.

Meanwhile, if a data is not the first data on the first SR resource configuration (i.e. there is already data on a logical channel having a higher priority of the first SR resource configuration), the UE doesn't trigger the regular BSR (S1011).

And when second data becomes available for a second LCH mapped to the first SR resource configuration after the data becomes available for the first LCH, the UE triggers a second BSR, if the second LCH has a higher priority than a priority of the first LCH.

On the other hand, the UE doesn't trigger a second BSR if there is a pending SR on the first SR resource configuration, when the second data becomes available for the second LCH mapped to the first SR resource configuration to avoid unnecessary waste of resources.

Figure 11:
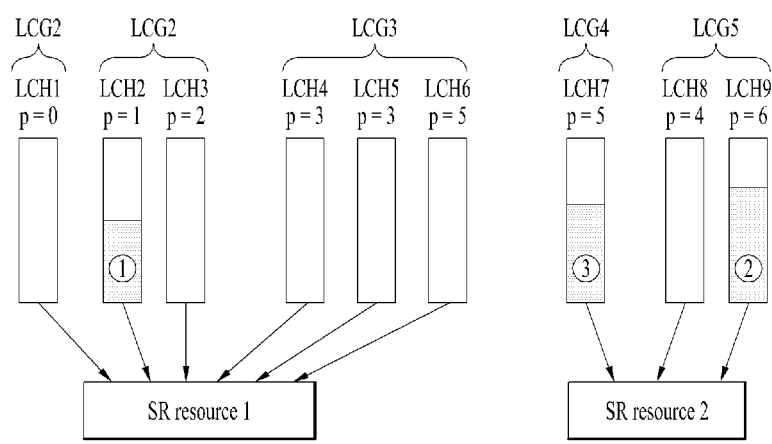
FIG. 11 is an example for triggering and transmitting a buffer status reporting in wireless communication system according to embodiments of the present invention.

FIG. 11 is an example for triggering and transmitting a buffer status reporting in wireless communication system according to embodiments of the present invention It is assumed that the UE is configured with 9 LCHs (LCH1-LCH9) with corresponding logical channel priorities (shown as 'p' in the figure) and logical channel group (LCG). And the UE is configured with 2 SR resources (SR resource 1 and SR resource 2). In this case the 'p' corresponding to a lower index has a higher priority.

The UE receives mapping information between LCH and SR resource. The LCH1-LCH6 are mapped to SR resource 1 (thus, LCH1-LCH6 are called SR group 1), and the LCH7-LCH9 are mapped to SR resource 2 (thus, LCH7-LCH9 are called SR group 2).

In case that UL resource is not available for any TTIs, when data becomes available in LCH2, as it is the first data of SR group 1, the UE triggers a regular BSR. As there is no available UL resource for transmitting the regular BSR, the UE triggers a SR and transmits SR on the SR resource 1 (step 1).

Later on, a data becomes available in LCH9. As it is the first data of SR group 2, the UE triggers a regular BSR, even though the logical channel priority of LCH9 is lower than that of LCH2 (step 2). As there is no available UL resource for transmitting the regular BSR, the UE triggers a SR and transmits SR on the SR resource 2.

Later on, a data becomes available in LCH7. As the LCH7 has higher priority than the LCH9, and they belong to different LCGs in the SR group 2, the UE triggers a regular BSR, even though the logical channel priority of LCH7 is lower than that of LCH2 (step 3). As there is no available UL resource for transmitting the regular BSR, the UE triggers a SR and transmits SR on the SR resource 2.

Alternatively, the UE does not trigger a BSR when data becomes available in LCH7 when the data becomes available in LCH7 (step 3'). Since a SR is already triggered on SR resource 2, triggering another SR on the same SR resource is redundant. Thus, triggering a BSR in this case is prohibited.

For this, when the data becomes available for the LCH7, the UE checks whether it is a first data of a SR group to which the LCH7 belongs. If it is the first data of the SR group, the UE triggers a regular BSR. Otherwise, i.e. there is data already available in other LCHs belonging to the SR group, the UE does not trigger a regular BSR.

Or, when the data becomes available for the LCH7, the UE checks whether there is any pending SR triggered on the SR resource that is mapped to the LCH7. If there is a pending SR on the SR resource, the UE does not trigger a regular BSR. Otherwise, i.e. there is no pending SR on the SR resource, the UE triggers a regular BSR.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a User Equipment (UE) operating in a wireless communication system, the method comprising:
configuring a first Schedule Request (SR) resource configuration and a second SR resource configuration;
checking whether data is first data on logical channels mapped to the first SR resource configuration, when the data becomes available for a first logical channel mapped to the first SR resource configuration, wherein the first logical channel has a lower priority than a highest priority among priorities of logical channels having data, which are mapped to the second SR resource configuration; and
triggering a first buffer status reporting (BSR) based on the data being the first data on logical channels mapped to the first SR resource configuration,
triggering a SR for the first SR configuration based on there being no available UL resource for transmitting the first BSR; and
transmitting the SR to a network,
wherein the UE doesn't trigger a second BSR based on there being a pending SR on the first SR resource configuration, when second data becomes available for a second logical channel mapped to the first SR resource configuration,
wherein the second data becomes available for the second logical channel after the data becomes available for the first logical channel.

2. The method according to claim 1, further comprising:
transmitting the first BSR to the network based on there being available an UL resource for transmitting the first BSR.

3. The method according to claim 1, further comprising:
triggering the second BSR when the second data becomes available for the second logical channel mapped to the first SR resource configuration, based on the second logical channel having a higher priority than the priority of the first logical channel.

4. The method according to claim 1, wherein the UE is capable of communicating with at least one of another UE, a UE related to an autonomous driving vehicle, a base station and a network.

5. A User Equipment (UE) for operating in a wireless communication system, the UE comprising:
transmitter and a receiver; and
a processor operably coupled with the transmitter and receiver and configured to:
configure a first Schedule Request (SR) resource configuration and a second SR resource configuration,
check whether data is first data on logical channels mapped to the first SR resource configuration, when the data becomes available for a first logical channel mapped to the first SR resource configuration, wherein the first logical channel has a lower priority than a highest priority among priorities of logical channels having data, which are mapped to the second SR resource configuration, and
trigger a first buffer status reporting (BSR) based on the data being the first data on logical channels mapped to the first SR resource configuration,
trigger a SR for the first SR for the first SR configuration based on there being no available UL resource for transmitting the first BSR, and
transmit the SR to a network,
wherein the UE doesn't trigger a second BSR based on there being a pending SR on the first SR resource configuration, when second data becomes available for a second logical channel mapped to the first SR resource configuration,
wherein the second data becomes available for the second logical channel after the data becomes available for the first logical channel.

6. The UE according to claim 5, wherein the processor is further configured to:
transmit the first BSR to the network based on there being available an UL resource for transmitting the first BSR.

7. The UE according to claim 5, wherein the processor is further configured to:

trigger the second BSR when the second data becomes available for the second logical channel mapped to the first SR resource configuration, based on the second logical channel having a higher priority than the priority of the first logical channel.

8. The UE according to claim 5, wherein the UE is capable of communicating with at least one of another UE, a UE related to an autonomous driving vehicle, a base station and a network.

* * * * *